United States Patent
Savvides et al.

(10) Patent No.: US 12,536,780 B2
(45) Date of Patent: Jan. 27, 2026

(54) SYSTEM AND METHOD FOR DETECTING, READING AND MATCHING IN A RETAIL SCENE

(71) Applicant: CARNEGIE MELLON UNIVERSITY, Pittsburgh, PA (US)

(72) Inventors: Marios Savvides, Pittsburgh, PA (US); Fangyi Chen, Pittsburgh, PA (US); Han Zhang, Pittsburgh, PA (US); ChenChen Zhu, Pittsburgh, PA (US)

(73) Assignee: CARNEGIE MELLON UNIVERSITY, Pittsburgh, PA (US)

(*) Notice: Subject to any disclaimer, the term of this patent is extended or adjusted under 35 U.S.C. 154(b) by 241 days.

(21) Appl. No.: 18/491,059

(22) Filed: Oct. 20, 2023

(65) Prior Publication Data
US 2024/0046621 A1     Feb. 8, 2024

Related U.S. Application Data (63) Continuation-in-part of application No. 18/272,754, filed as application No. PCT/US2022/019553 on
(Continued)

(51) Int. Cl.
    *G06K 9/00*        (2022.01)
    *G06V 10/764*     (2022.01)
    (Continued)

(52) U.S. Cl.
    CPC .......... *G06V 10/774* (2022.01); *G06V 10/764* (2022.01); *G06V 10/766* (2022.01);
    (Continued)

(58) Field of Classification Search
    CPC ...... G06V 10/82; G06V 10/774; G06V 10/25; G06V 10/764; G06V 10/454; G06V 20/42; G06V 20/52; G06V 20/56; G06V 20/58; G06V 20/588; G06V 2201/07; G06V 30/19173; G06V 10/225; G06V 10/245;
    (Continued)

(56) References Cited

U.S. PATENT DOCUMENTS

| | | |
|---|---|---|
| 7,020,335 B1 | 3/2006 | Abousleman |
| 2017/0124415 A1* | 5/2017 | Choi ...................... G06V 10/25 |

(Continued)

FOREIGN PATENT DOCUMENTS

WO     2023107599 A1     6/2023

OTHER PUBLICATIONS

Lin et al., "Feature Pyramid Networks for Object Detection," In: IEEE Conference on Computer Vision and Pattern Recognition (CVPR): 2117-2125 (2017).

(Continued)

*Primary Examiner* — Alex Kok S Liew
(74) *Attorney, Agent, or Firm* — KDW FIRM PLLC (57) ABSTRACT

Disclosed herein are designs for two baselines to detect products in a retail setting. A novel detector, referred to herein as RetailDet, detects quadrilateral products. To match products using visual texts on 2D space, text features are encoded with spatial positional encoding and the Hungarian Algorithm that calculates optimal assignment plans between varying text sequences is used.

12 Claims, 6 Drawing Sheets

Related U.S. Application Data

Mar. 9, 2022, application No. 18/491,059, filed on Oct. 20, 2023 is a continuation-in-part of application No. PCT/US2022/052219, filed on Dec. 8, 2022.

(60) Provisional application No. 63/417,828, filed on Oct. 20, 2022, provisional application No. 63/167,709, filed on Mar. 30, 2021, provisional application No. 63/267,119, filed on Dec. 8, 2021.

(51) Int. Cl.

| | | |
|---|---|---|
| *G06V 10/766* | (2022.01) | |
| *G06V 10/77* | (2022.01) | |
| *G06V 10/774* | (2022.01) | |
| *G06V 10/776* | (2022.01) | |
| *G06V 10/82* | (2022.01) | |
| *G06V 30/18* | (2022.01) | |
| *G06V 30/19* | (2022.01) | |

(52) U.S. Cl.
CPC ........ *G06V 10/7715* (2022.01); *G06V 10/776* (2022.01); *G06V 10/82* (2022.01); *G06V 30/1801* (2022.01); *G06V 30/19093* (2022.01); *G06V 30/19147* (2022.01)

(58) Field of Classification Search
CPC ........ G06V 10/40; G06V 10/46; G06V 10/50; G06V 10/751; G06V 10/809; G06V 20/586; G06V 20/647; G06V 2201/03; G06V 2201/031; G06V 40/10; G06V 40/103; G06V 10/26; G06V 10/44; G06V 10/72; G06V 10/762; G06V 10/766; G06V 10/7715; G06V 20/13; G06V 20/60; G06V 20/62; G06V 30/153; G06N 3/045; G06N 3/08; G06N 20/00; G06N 3/04; G06N 5/046; G06F 18/214; G06F 18/217; G06F 18/24

See application file for complete search history.

(56) References Cited

U.S. PATENT DOCUMENTS

| | | | |
|---|---|---|---|
| 2018/0330198 | A1 | 11/2018 | Harary |
| 2019/0057507 | A1 | 2/2019 | El-Khamy |
| 2019/0096086 | A1 | 3/2019 | Xu et al. |
| 2019/0294889 | A1 | 9/2019 | Sriram |
| 2019/0325243 | A1* | 10/2019 | Sikka ............... G06V 10/255 |
| 2020/0025931 | A1 | 1/2020 | Liang |
| 2020/0211202 | A1 | 7/2020 | Zhang et al. |
| 2020/0364876 | A1* | 11/2020 | Mohan ............... G06N 3/08 |
| 2021/0001885 | A1 | 1/2021 | Zhang |
| 2021/0012116 | A1 | 1/2021 | Urtasun |
| 2021/0156963 | A1 | 5/2021 | Popov |
| 2021/0157006 | A1 | 5/2021 | Sun |
| 2021/0366099 | A1* | 11/2021 | Liao ............... G06F 40/216 |
| 2022/0051094 | A1 | 2/2022 | Chentanez et al. |
| 2024/0104761 | A1 | 3/2024 | Savvides et al. |

OTHER PUBLICATIONS

Yang et al., "Rotated Faster R-CNN for Oriented Object Detection in Aerial Images," In: Proceedings of the 3rd International Conference on Robot Systems and Applications (ICRSA): 35-39 (2020).

Fathi et al., "Semantic Instance Segmentation via Deep Metric Learning" Mar. 30, 2017 arXiv:1703.10277 [cs.CV].

International Search Report and Written Opinion for the International Application No. PCT/US22/19553, mailed Jul. 12, 2022, 13 pages.

International Search Report and Written Opinion for the International Application No. PCT/US22/52219, mailed Jun. 15, 2023, 7 pages.

* cited by examiner

SYSTEM AND METHOD FOR DETECTING, READING AND MATCHING IN A RETAIL SCENE

RELATED APPLICATIONS

This application claims the benefit of U.S. Provisional Patent Application No. 63/417,828, filed Oct. 20, 2022 This application is also a continuation-in-part of U.S. patent application Ser. No. 18/272,754, filed Jul. 17, 2023, which is a filing under section 371 of PCT application PCT/US2022/019533, filed Mar. 9, 2022, which claims the benefit of U.S. Provisional Patent Application No. 63/167,709, filed Mar. 30, 2021. This application is also a continuation-in-part of PCT application PCT/US2022/052219, filed Dec. 8, 2022, which claims the benefit of U.S. Provisional Patent Application No. 63/287,119, filed Dec. 8, 2021. The contents of each of these applications are incorporated herein in their entireties.

BACKGROUND OF THE INVENTION

Various visual sensors (e.g., fixed cameras, robots, drones, mobile phones, etc.) can be deployed in retail stores, enabling advanced computer vision methods in shopping and restocking. Scene Product Recognition (SPR) is the foundation module in most of these frameworks, such as planogram compliance, out-of-stock managing, and automatic check-out.

SPR refers to the automatic detection and recognition of products in complex retail scenes. It comprises steps that first localize products and then recognize them via the localized appearance, analogous to many recognition tasks. However, scene products have their characteristics: they are densely-packed, low-shot, fine-grained, and widely-categorized. These innate characteristics result in obvious challenges and will be a continuing problem.

Traditional detection targets poorly comply with the actual needs, causing improper image alignment of the product appearances. Detection targets in common scenes are usually defined as covering the utmost visible entirety of an object with a minimal rectangle box. This format is inherited by most existing retail datasets. However, because occlusion occurs more frequently between products (the densely-packed characteristic), improper alignments can easily hinder the detection performance. Detectors equipped with Non-Maximum Suppression (NMS) suffer from the overlaps among the axis aligned rectangular bounding boxes (AABB) and rotated rectangular bounding boxes (RBOX). Moreover, poor alignment leads to inconsistent image registration of the same products, which brings extra difficulties to accurate recognition.

Even in the well-aligned cases, products from intra-classes require discriminative features due to their fine-grained characteristic. On the one hand, a slight variation in the product packaging can significantly change the product price, especially for the visually similar but textually different regions such as brand/model, flavour/version, ingredient/material, count/net weight. This requires SPR algorithms to pay attention to the particular text patterns. On the other hand, due to the labelling effort on thousands of categories per store (the widely-categorized characteristic), the available samples per category are scarce (the low-shot characteristic), which degrades the SPR robustness. These two constraints are in conjunction with our empirical observation that visual classifiers could frequently make mistakes when products look similar but vary in text information.

SUMMARY OF THE INVENTION

Figure 1:
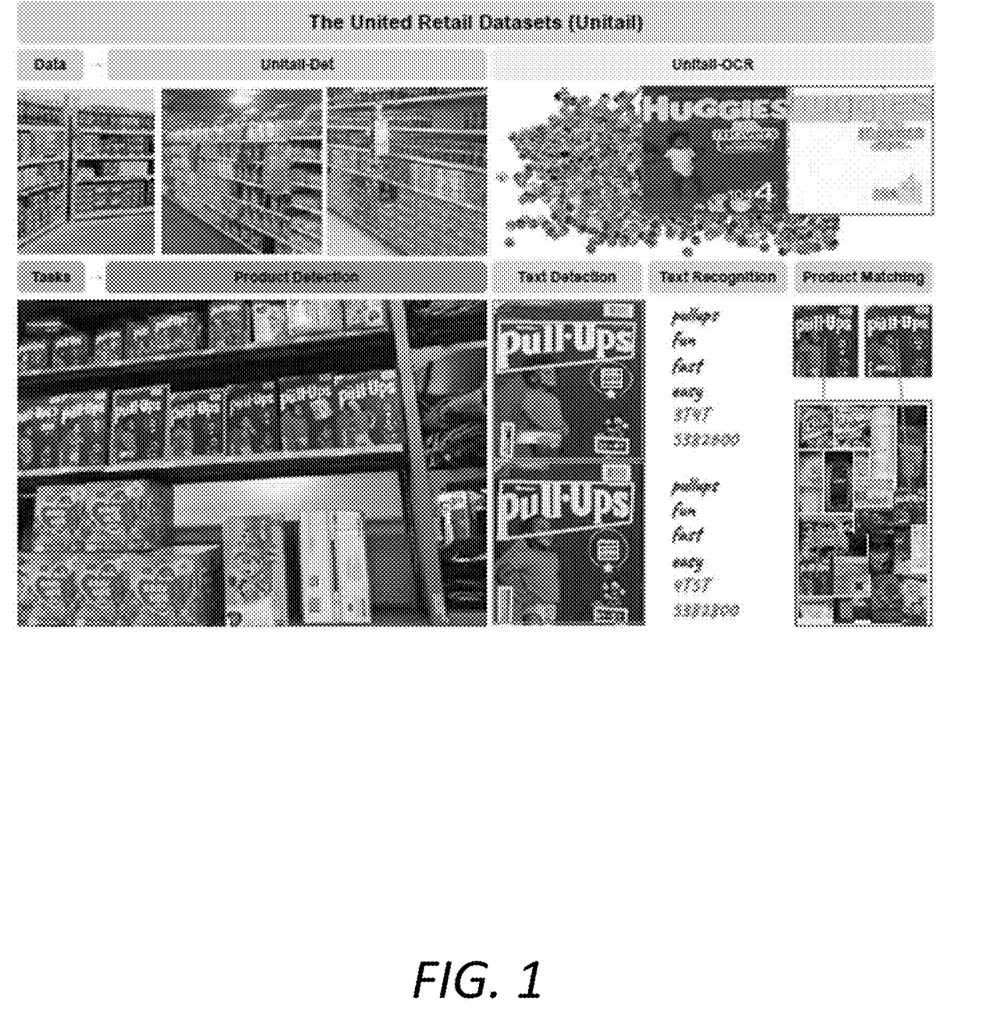
FIG. 1 is a block diagram showing the two datasets and four tasks of the present invention.

Disclosed herein is the United Retail Datasets (Unitail) that responds to these issues. As shown in FIG. 1, Unitail is a comprehensive benchmark composed of two datasets: Unitail-Det and Unitail-OCR, and four tasks in real-world retail scene: Product Detection, Text Detection, Text Recognition and Product Matching.

Unitail-Det is one of the largest quadrilateral object detection datasets in terms of instance number and the only existing product dataset having quadrilateral annotations. It is designed to support well-aligned product detection. Unitail-Det enjoys two key features: First, bounding boxes of products are densely annotated in the quadrilateral style that cover the frontal face of products. Practically, quadrilaterals (QUADS) adequately reflect the shapes and poses of most products regardless of the viewing angles, and efficiently cover the irregular shapes. The frontal faces of products provide distinguishable visual information and keep the appearances consistent. Second, to evaluate the robustness of the detectors across stores, the test set consists of two subsets to support both origin-domain and cross-domain evaluation. While one subset shares the domain with the training set, the other is independently collected from other different stores, with diverse optical sensors, and from various camera perspectives.

Unitail-OCR (Optical Character Recognition) drives research and applications using visual texts as representations for products. This is partially inspired by the customers' behavior: people can glance and recognize ice cream but need to scrutinize the flavor and calories to make a purchase. It is organized into three tasks: text detection, text recognition, and product matching. Product images in Unitail-OCR are selected from the Unitail-Det and benefit from the quadrilateral aligned annotations. Each is equipped with on product text location and textual contents together with its category. Due to the product's low-shot and widely-categorized characteristics, product recognition is operated by matching within an open-set gallery. Unitail-OCR is the first dataset to support OCR models' training and evaluation on the retail products and fills in the domain blank. When evaluated on a wide variety of product texts, models trained on Unitail-OCR outperform those trained on common scene texts. It is also the first dataset that enables the exploration of text-based solutions to product matching.

Based on the proposed Unitail, two baselines are designed. To detect products, a novel detector, referred to herein as RetailDet, detects quadrilateral products. To match products using visual texts on 2D space, text features are encoded with spatial positional encoding and the Hungarian Algorithm that calculates optimal assignment plans between varying text sequences is used.

BRIEF DESCRIPTION OF THE DRAWINGS

By way of example, specific exemplary embodiments of the disclosed systems and methods will now be described, with reference to the accompanying drawings, in which.

DETAILED DESCRIPTION

To make full use of computer vision technology in stores the actual needs that fit the characteristics of the retail scene must be considered. Pursuant to this goal, disclosed herein is the United Retail Datasets (Unitail), a large-scale benchmark of basic visual tasks on products that challenges algorithms for detecting, reading, and matching. The dataset comprises approximately 1.8M annotated quadrilateral-shaped instances.

Furthermore, it provides a gallery-style OCR dataset containing 1454 product categories, 30 k text regions, and 21 k transcriptions to enable robust reading on products and motivate enhanced product matching. Also disclosed herein is a new detector for product detection that provides a simple OCR-based matching solution that verifies its effectiveness.

Unitail comprises two separate datasets, Unitail-Det and Unitail-OCR, which will now be fully explained.

Unitail-Det—Regarding image collection, the industry utilizes a variety of sensors under different conditions for product detection. The resolution and camera angles cover an extensive range by different sensors. For example, fixed cameras are mounted on the ceiling in most cases, and customers prefer to photograph with mobile devices. The product categories in different stores also span a great range. With these factors in mind, images were collected from two sources to support origin-domain and cross-domain detection. In the origin-domain, training and testing images are supposed to share the same domain and are taken from similar perspectives in the same stores by the same sensors. As a result, 11,744 images were selected from another product dataset to form the origin-domain. In the cross domain, 500 images in different stores were collected using multiple sensors, covering unseen categories and camera angles.

Figure 2:
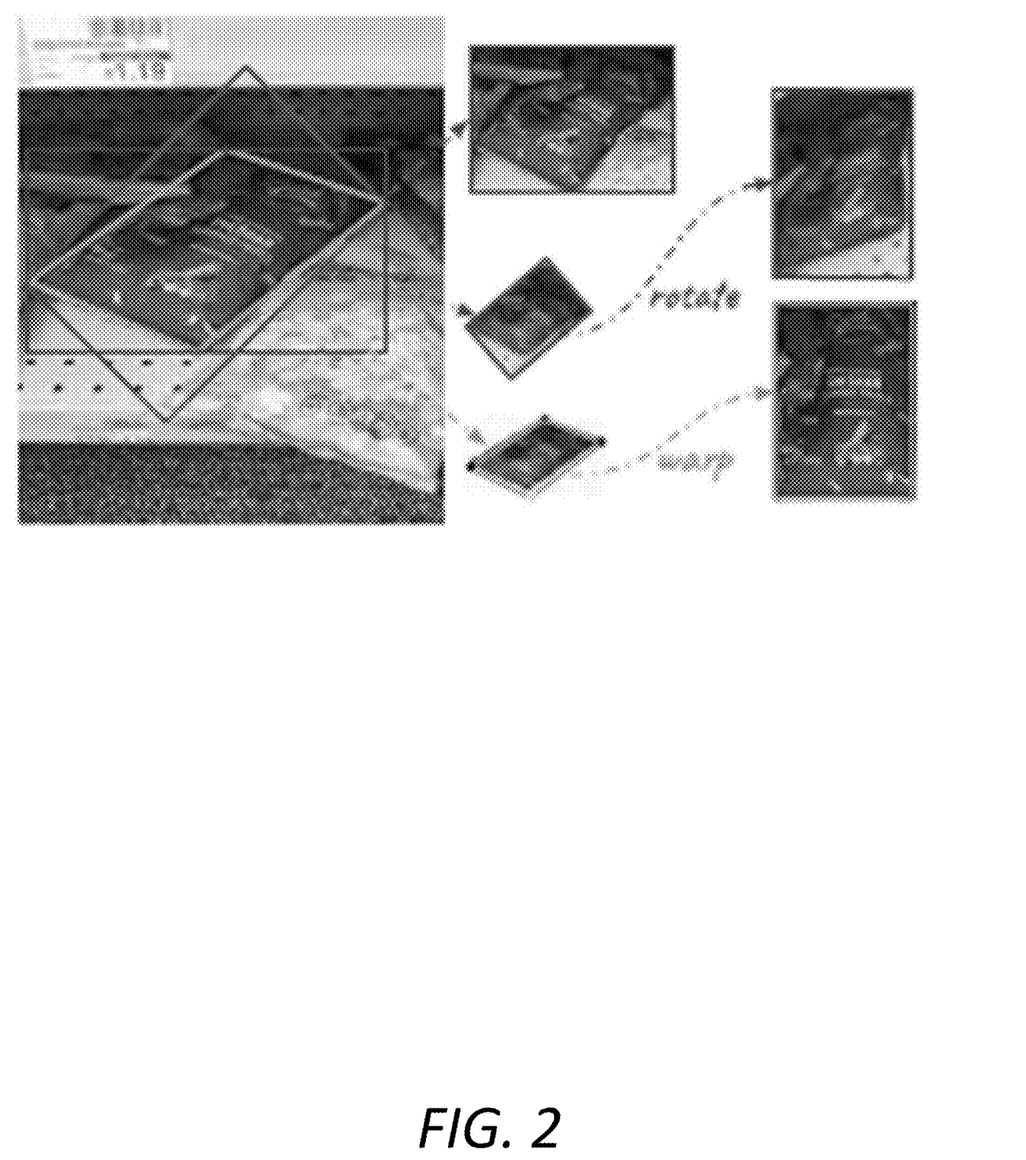
FIG. 2 is an illustration showing a quadrilateral bounding box (QIAD) as a natural fit to a product in a real scene, removing more noisy context than an axis-aligned bounding box (AABB) or a rectangular bounding box (RBOX).

Each product was annotated with a quadrilateral style bounding box, denoted as QUAD. FIG. 2 is an illustration the use of a QUAD bounding box as opposed to an AABB or a RBOX. A QUAD refers to 4 points $p_{tl}, p_{tr}, p_{bl}, p_{br}$ with 8 degrees of freedom ($x_{tl}, y_{tl}, x_{tr}, y_{tr}, x_{bl}, y_{bl}, x_{br}, y_{br}$). For regular products shaped mainly in cuboid and cylinder, the ($x_{tl}, y_{tl}$) is defined as the top-left corners of their frontal faces, and the other points represent the remaining 3 corners in clockwise order. For spherical, cones, and other shapes whose corners are difficult to identify, and for irregularly shaped products where a quadrilateral box cannot cover the entire frontal face, the minimum AABB is first drawn and then the four corners are adjusted according to the camera perspective. The frontal face of a product has the most representative information and is also critical for appearance consistency, but the side face of the product is still annotated if the front face is not visible.

Figure 3:
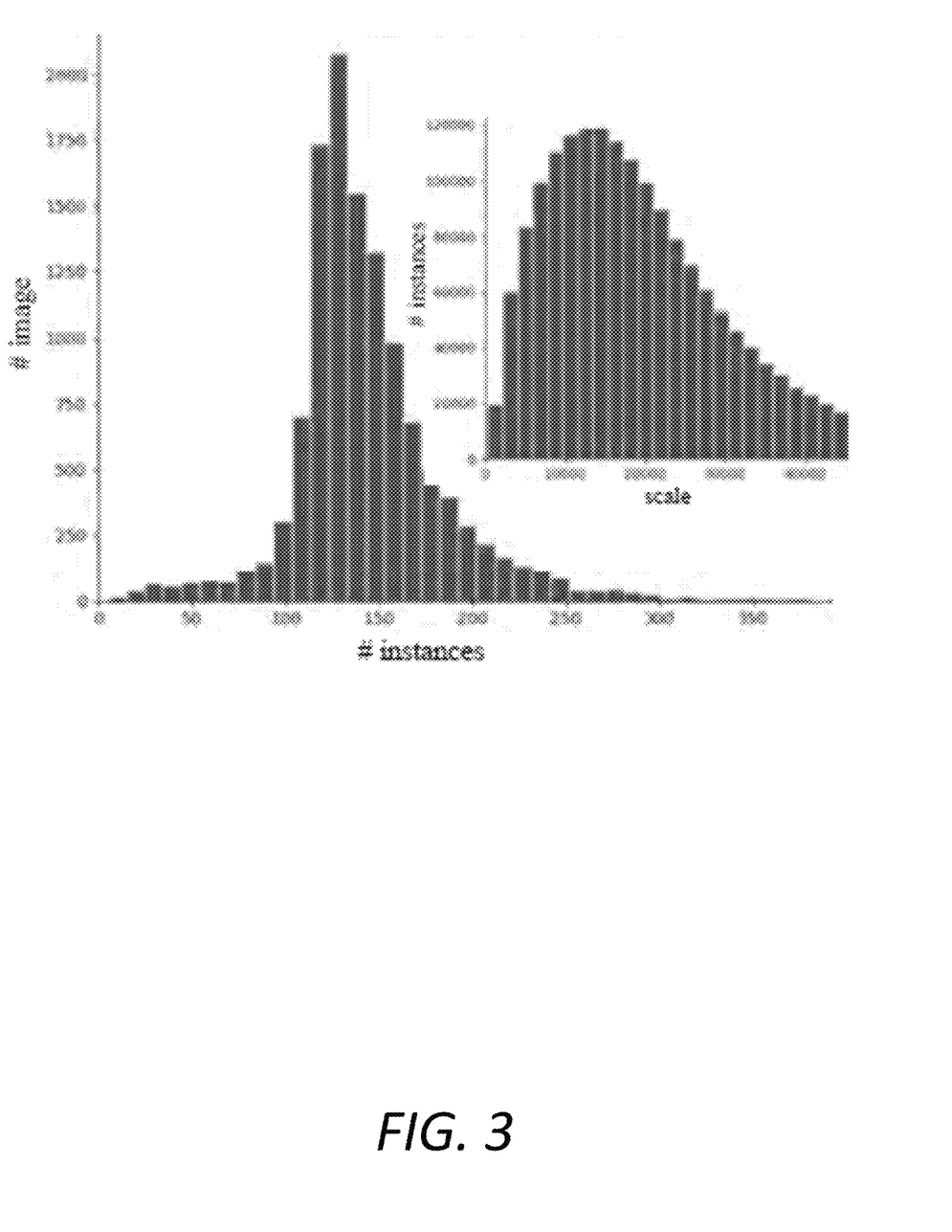
FIG. 3 is a graph showing instance density (left) versus instance scale (right) of the Unitail-Det dataset.

In total, 1,777,108 QUADs are annotated by 13 well-trained annotators in 3 rounds of verification. The origin-domain is split to training (8,216 images, 1,215,013 QUADs), validation (588 images, 92,128 QUADs), and origin-domain testing set (2,940 images, 432,896 QUADs). The cross-domain supports a testing set (500 images, 37,071 QUADs). The density and scale of the Unitail-Det dataset are shown in FIG. 3.

Unitail-OCR—A product gallery setup is a common practice in the retail industry for product matching applications. All known categories are first registered in the gallery. In case of a query product, the matching algorithms find the top ranked category in the gallery. The gallery of the Unitail-OCR dataset contains 1454 fine-grained and one-shot product categories. Among these products, 10709 text regions and 7565 legible text transcriptions (words) are annotated. This enables the gallery to act as the training source and the matching reference. The testing suite contains four components: (1) 3012 products labeled with 18972 text regions for text detection; (2) Among the pre-localized text regions, 13416 legible word-level transcriptions for text recognition; (3) 10 k product samples from the 1454 categories for general evaluation on product matching; and (4) From the 10 k products, selected 2.4 k fine-grained samples (visually similar for humans) for hard-example evaluation on product matching.

Images are gathered from the Unitail-Det cross-domain and cropped and affine transformed according to the quadrilateral bounding boxes to form an upright appearance. The low-quality images with low resolution and high blurriness were removed. Some products kept in the Unitail-OCR dataset might exclude text regions, like those from the produce and clothes departments. One sample was randomly selected from each category to form the product gallery, and the remaining samples were further augmented by randomly adjusting the brightness and cropping for matching purposes.

Figure 4:
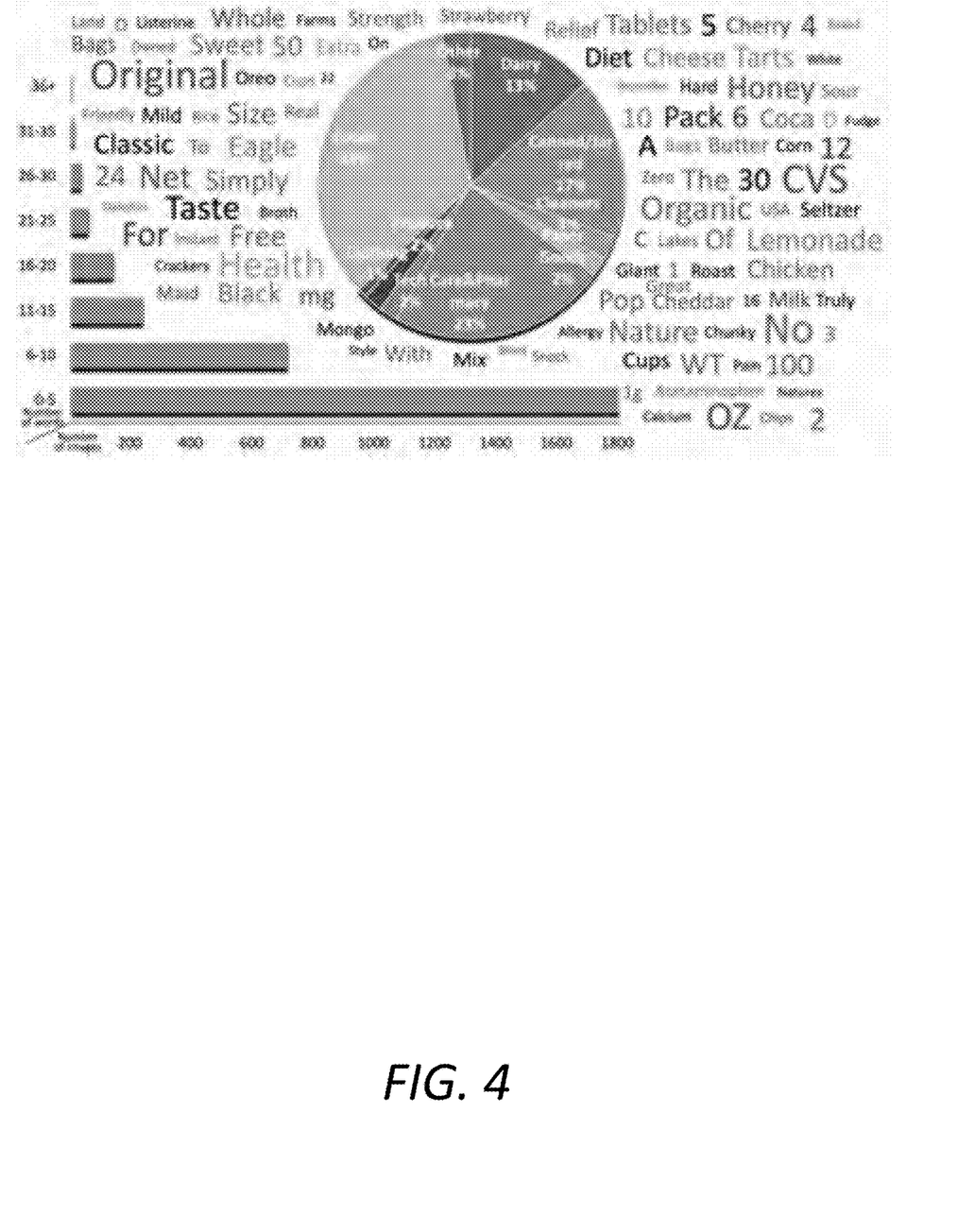
FIG. 4 is a pie chart showing sections that source images were collected from. The bar chart is a histogram for the count of words on products. The font size of the words reflects the frequency of occurrence.

29681 text regions from 4466 products were annotated as quadrilateral text boxes. FIG. 4 shows the statistics. The bounding boxes are first classified as legible or illegible. For the 20981 legible ones, the alphanumeric transcriptions are annotated ignoring letter case and symbols. Numerical values with units are commonly seen on products such as 120 mg, and we regard them as entire words. A vocabulary that covers all words present is also provided. The usage of vocabulary is more practical in the case of retail product recognition because the presence of products and texts are usually known in advance by the store owner.

Product Detection Task—The goal is to detect products as quadrilaterals from complex backgrounds. Unitail-Det supports the training and evaluation. The geometric mean of mean average precision (mAP) calculated on the origin-domain test set and cross-domain test set is used as the primary metric for the product detection, where the mAP is calculated in MS-COCO style. Compared to an arithmetic mean, the geometric mean is more sensitive when the model overfits to origin-domain but gains low performance on the cross-domain.

Text Detection Task—The goal is to detect text regions from pre-localized product images. Unitail-OCR supports the training and evaluation. The widely used precision, recall and hmean is adopted for evaluation.

Text Recognition Task—The goal is to recognize words over a set of pre-localized text regions. Unitail-OCR supports the training and evaluation. The normalized edit distance and word-level accuracy is adopted for evaluation. The edit distance between two words is defined by the minimum number of characters edited (inserted, deleted or substituted) required to change one word into the other, normalized by the length of the word and averaged on all ground-truths.

Product Matching Task—The goal is to recognize products by matching a set of query samples to the Unitail-OCR gallery. The task is split into two tracks: Hard Example Track, which is evaluated on 2.5 k selected hard examples. This track is designed for scenarios in which products are visually similar (for example pharmacy stores). General Track, which is conducted on all 10 k samples. The top-1 accuracy is adopted as the evaluation metric.

Customized Detector for Product Detection—Recent studies on generic object detection apply prior-art Dense-Box-style head to multiple levels of a feature pyramid. The feature pyramid is generated via feature a pyramid network (FPN) and contains different levels that are gradually down-sampled but semantically enhanced. An anchor-free detection head is then attached to classify each pixel on the feature pyramid and predict axis-aligned bounding boxes (AABB).

During training, assigning ground-truths to each feature pixels on the feature pyramid plays a key role. On each pyramid level, the centerness is widely used. It is an indicator to value how far a pixel locates from the center of a ground-truth: the farther, the more likely it is to predict an inaccurate box, and the lower centerness score it gains. Across pyramid levels, various strategies are proposed to determine which level should be assigned, and they are grouped into scale-based and loss-based strategies. The scale-based strategy assigns ground-truths to different levels in terms of their scales. The larger scale, the higher level is assigned so that the needs of receptive field and resolution of feature maps are balanced. The loss-based like Soft Selection assigns ground truths by calculating their losses on all levels and trains an auxiliary network that re-weights the losses.

The novel detector disclosed here, referred to as Retail-Det, adopts the DenseBox style of architecture but predicts the four corners of quadrilateral by an 8-channel regression head. During training, the prior assignment strategies were found to be unsuitable for quadrilateral products, which is specified below.

Centerness—The previous definition of centerness is given by:

$$C_{FCOS}(p) = \left[\frac{\min(d_p^l, d_p^r)}{\max(d_p^l, d_p^r)} \cdot \frac{\min(d_p^t, d_p^b)}{\max(d_p^t, d_p^b)}\right]^{0.5} \quad (1)$$

Figure 5A:
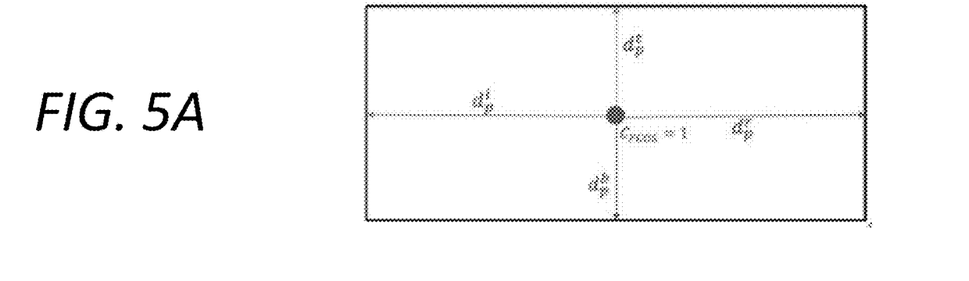
FIGS. 5A, 5B are graphical representations of mathematical centerness with respect to an AABB and a QUAD, respectively.
Figure 5B:
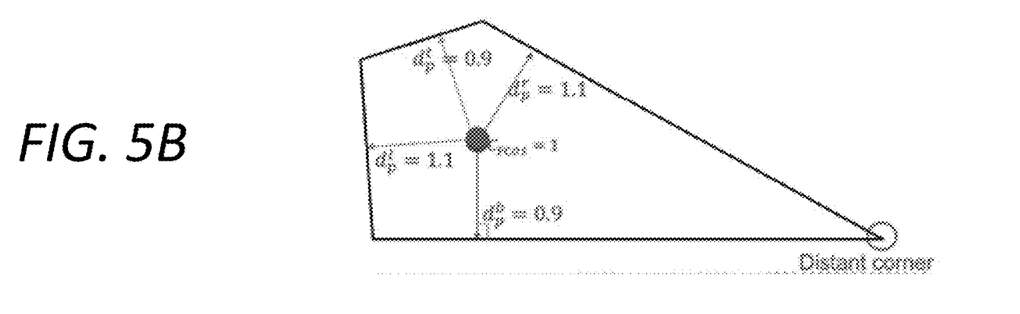

As given by Eq. (1) and shown graphically in FIG. 5A, a location p that keeps the same distance to the left/right boundaries $$(d_p^l = d_p^r)$$

and to the top/bottom boundaries $$(d_p^t = d_p^b)$$

will gain the highest centerness 1, and other pixels gain degraded scores I accordance with Eq. (1). When adopting the same centerness to quadrilaterals, as shown in FIG. 5B, the center can be far away from a distant corner, which leads to unbalanced regression difficulty and lack of receptive field from that corner.

Figure 5C:
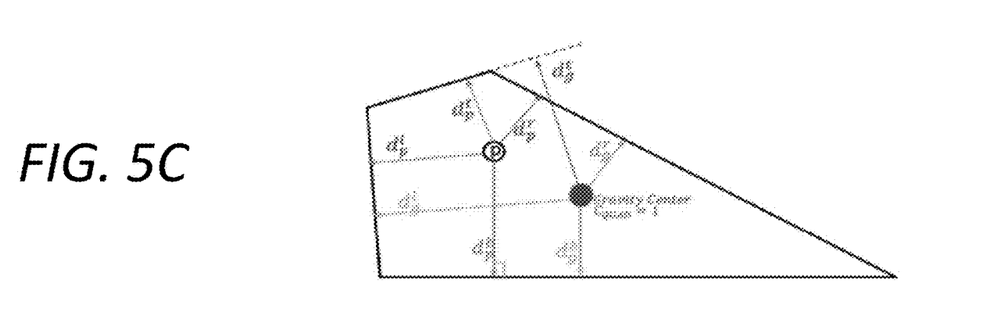
FIGS. 5C, 5D are graphical representations of geometric centerness with respect to a QUAD.
Figure 5D:
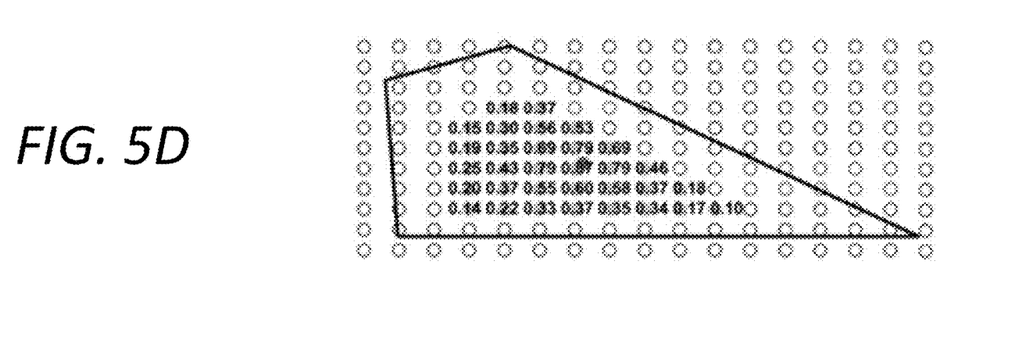

The solution adopted for the disclosed detector re-defines the center as the center of gravity, as shown In FIG. 5C, because it is the geometric center and represents the mean position of all the points in the shape, which mitigates the unbalanced regression difficulties. Eq. (2) is then used to calculate the quad-centerness for any p:

$$C_{QUAD}(p) = \left[\frac{\min(d_p^l, d_g^l)}{\max(d_p^l, d_g^l)} \cdot \frac{\min(d_p^r, d_g^r)}{\max(d_p^r, d_g^r)} \cdot \frac{\min(d_p^t, d_g^t)}{\max(d_p^t, d_g^t)} \cdot \frac{\min(d_p^b, d_g^b)}{\max(d_p^b, d_g^b)}\right]^{0.5} \quad (2)$$

where:

$$d_g^{l/r/t/b}$$

denotes the distances between the gravity center g and the left/right/top/bottom boundaries; and $$d_p^{l/r/t/b}$$

denotes the distances between the p and the boundaries.
I
If p locates on the gravity center, its quad-centerness gains the highest value as 1. Otherwise, it is gradually degraded, as shown in FIG. 5D. It is worth mentioning that Eq. (2), when applied to an AABB is mathematically equivalent to Eq. (1).

Soft Selection—Loss-based Soft Selection outperforms scale-based strategies on generic objects because it assigns ground-truths to multiple levels and re-weights their losses. This is achieved by calculating losses for each object on all levels and using the losses to train an auxiliary network that predicts the re-weighting factors. Instances per image are numerous in densely-packed retail scene, and Soft Selection is highly inefficient (i.e., 5× slower) due to the auxiliary network.

The solution adopted for the disclosed detector (Soft Scale) maintains the merit of Soft Selection while accelerating the assignment. The solution mimics the loss re-weighting mechanism of the auxiliary network using scale-based calculation. This is feasible because the Soft Selection, in essence, follows scale-based law. Soft Scale (SS) is given by Eqs. (3-6). For an arbitrary shaped object O with area $area_O$, SS assigns it to two adjacent levels $l_i$ and $l_j$ by Eqs. (3,4) and calculates the loss-reweighting factors $F_{l_i}$, $F_{l_j}$ by Eqs. (5,6):

$$l_i = \lceil l_{org} + \log_2(\sqrt{area_O}/224) \rceil \quad (3)$$

$$l_j = \lfloor l_{org} + \log_2(\sqrt{area_O}/224) \rfloor \quad (4)$$

$$F_{l_i} = \lceil l_{org} + \log_2(\sqrt{area_O}/224) \rceil - \lfloor l_{org} + \log_2(\sqrt{area_O}/224) \rfloor \quad (5)$$

$$F_{l_j} = 1 - F_{l_i} \quad (6)$$

where 224 is the ImageNet pre-training size.

Objects with exact area $224^2$ are assigned to $l_{org}$, in which case $l_i = l_j = l_{org}$. If an object is with area $223^2$, SS assigns it to $l_{org}$ with $F_{l_{org}} = 0.994$, and also to $(l_{org}-1)$ with $F_{(l_{org}-1)} = 0.006$. herein $l_{org}$ is fixed to be level 5 of the feature pyramid. SS operates rapidly as scale-based strategies and keeps the loss-reweighting like Soft Selection.

Product Matching—Generally, people glance and recognize the product, and if products looks similar, they further scrutinize the text (if it appears) to make a decision. To this end, a well-trained image classifier is first applied that extracts visual features $F_{g_i}^v$ from each gallery image $g_i$ and feature $f_p^v$ from query image p, and the cosine similarity between each pair $(f_{g_i}^v, f_p^v)$ is calculated (referred to as $sim_i^v$). If the highest ranking value $sim_1^v$ and the second highest $sim_2^v$ are close (i.e., $sim_1^v - sim_2^v \leq t$), the products are then read on and the textual similarity calculated (referred to as $sim^t$). The decision is given by:

$$\text{Decision} = \underset{i \in [1,2]}{\arg\max}[w \cdot sim^t(g_i, p) + (1-w) \cdot sim_i^v] \quad (7)$$

where threshold t and coefficient w are tuned on the validation set.

Figure 6A:
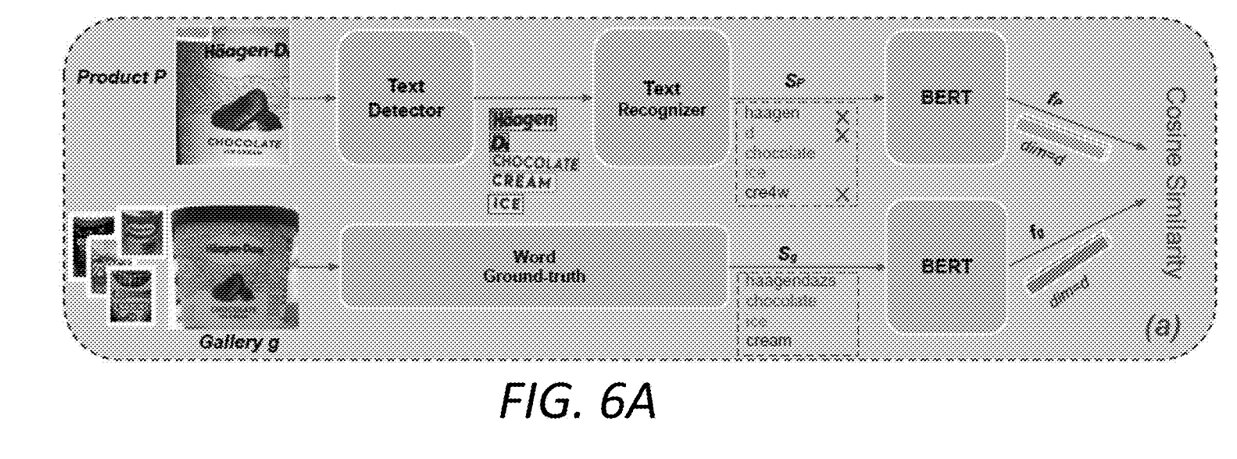
FIG. 6A is an illustration of a processing pipeline with BERT encoded features.

The disclosed invention focuses on how to calculate $sim^t$. The on-product texts obtained from ground-truth or OCR prediction are denoted as $S = \{s^1, s^2, \ldots s^N\}$ where N varies. Sequence-to-one models (e.g., BERT) may be used to encode S into a fixed length feature vector $f = \mathbb{R}^d$. As shown in FIG. 6A, a text detector is followed by a text recognizer predicting n=5 words, and the 5 words are fed into the BERT to encode a feature vector $f_p = \mathbb{R}^d$. For each gallery image g, the same process is operated to get a feature vector $f_g = \mathbb{R}^d$, and $sim^t(f_p, f_g)$ is calculated by the cosine similarity.

Figure 6B:
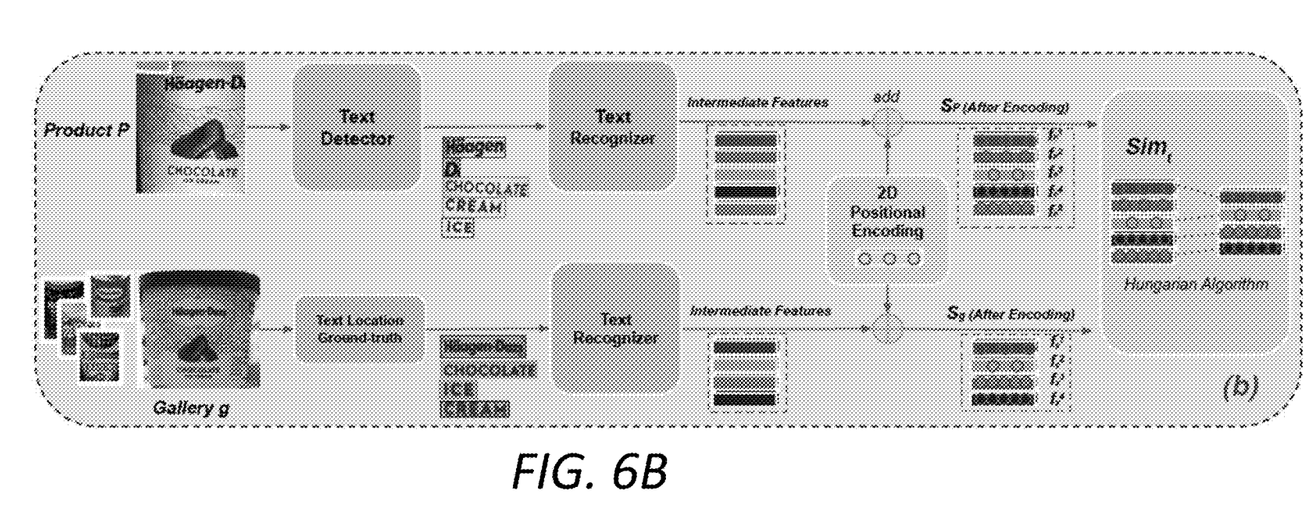
FIG. 6B illustrates a processing pipeline with positional encoding and Hungarian Algorithm based textual similarity.

But this design does not perform well because errors from OCR models (especially from text recognizer) are propagated to the BERT causing poor feature encoding. Moreover, the positional information of text boxes is lost in the sequence. To solve this issue, a new design is introduced herein, shown in FIG. 6B. Rather than using the n recognized words, n intermediate feature vectors from the text recognizer are used to mitigate propagated errors. For example, CREAM may be confused as CRE4w, but the intermediate feature should maintain information on A and M, which is more robust than the false prediction. Each feature is then added by a 2D positional encoding whose calculation is based on the location of the corresponding text. It encodes the spatial information into the feature and it is predefined to keep the same dimension as the intermediate feature. This results in a sequence that contains the n encoded features $f^{1 \sim n}$, with $$S_p = \{f_p^1, f_p^2, f_p^3, f_p^4, f_p^5\}$$

from a query product and $$S_g = \{f_g^1, f_g^2, f_g^3, f_g^4\}$$

from a gallery reference. Inspired by the Hungarian Algorithm, Eq. (8) below directly calculates the similarity between two sequences with varying length:

$$sim^t(p, g) = sim^t(S_p, S_g) = \max_X \sum_{i=1}^{n} \sum_{j=1}^{m} \left( \frac{f_p^i \cdot f_g^j}{|f_p^i| \cdot |f_g^j|} X_{ij} \right)$$

where X is an n×m Boolean matrix where $\Sigma_j X_{ij} = 1$, $\Sigma_i X_{ij} = 1$.

Eq. (8) maximizes the summation of cosine similarities from assigned feature pairs, and the assignment is optimized by X.

Base Network (RetailDet)—The base network design disclosed herein applies a prior-art DenseBox-style head to multiple feature pyramid levels. The feature pyramid is generated via feature pyramid network (FPN) which utilizes a deep convolutional network as the backbone. As an image is fed into the backbone, several feature maps are extracted to compose the initial feature pyramid. The design adopts the ResNet family as the backbone, and the extracted feature maps are from C3 to C5. The feature maps after FPN are denoted as P3, P4, P5. An anchor-free detection head is then attached. The detection head contains two branches. The first is a binary classification branch to predict a heatmap for product/background. The second is a regression branch to predict the offset from the pixel location to the four corner points of the QUAD. Each branch consists of 3 stacks of convolutional layers followed by another c channel convolutional layer, where c equals 1 for the classification branch and 8 for the regression branch.

Corner Refinement Module (RetailDet++)—This is RetailDet enhanced with a Corner Refinement Module (CRM) and deeper backbone. For each predicted QUAD from the RetailDet, we get the locations of its four corners and center. Then we apply the bilinear interpolation to extract feature of 5 points (4 corners, one center) from the feature map generated by the 3rd stacked convolution in the regression branch. These features are concatenated and fed into a 1×1 convolutional layer to predict the offsets between groundtruth and the former predictions. The same operation and convolution are also inserted into the classification branch to predict retail/background as a 2nd-stage classification. During testing, the regression results from the two stages are combined but only the classification result from the first stage is used. The 5 points as mentioned above are enough for quadrilateral products, and the 2nd-stage classification helps training though not involved in testing.

Losses—During training, the QUADs are first shrunk by a ratio $\alpha = 0.3$ according to the gravity centers. If one feature pixel locates inside the shrunk QUAD, the pixel is considered responsible for learning the ground-truth. Focal loss is used for classification and SmoothL1 loss is used for regression. Both losses are reweighted by the production of quad-centerness and level reweighting factor F. The total loss is the summation of the classification and regression losses. If two-stage, additional focal loss and L1 loss for CRM are added to the total loss.

The United Retail Datasets (Unitail), a large-scale benchmark aims at supporting well-aligned textually enhanced scene product recognition is disclosed herein. It involves quadrilateral product instances, on-product texts, product matching gallery, and testing suite. Two baseline designs that take advantages of the Unitail and provide comprehensive benchmark experiments on various state-of-the-art methods were also disclosed.

The invention claimed is:
1. A method of training a detector for use in a retail setting for product detection comprising:
  obtaining a dataset of product images containing both origin-domain quadrilateral annotated images and cross domain images annotated with quadrilateral bonding boxes; and
  for one or more images in the dataset generating a feature pyramid via a feature pyramid network, using an image from the dataset, wherein the image is fed to a deep convolutional network backbone which extracts a plurality of feature maps to compose the initial feature pyramid;

applying an anchor-free detection head coupled to the feature pyramid network, the detection head comprising:
  a binary classification branch to predict a heatmap for the product versus the background of the image; and
  a regression branch to predict offsets from each pixel location to the corner points and center point of the quadrilateral bounding box; wherein the regression branch predicts four corners and a center of the quadrilateral bounding box;

wherein the geometric centerness of each pixel on each level of the feature pyramid is calculated, the centerness indicating how far a pixel is located from a center of a ground truth.

2. The method of claim 1 further comprising:
shrinking the quadrilateral bounding box by a predetermined factor;
calculating a loss for the classification branch and the regression branch;
reweight both losses by a product of quad-centerness and a level reweighting factor; and
calculating a total loss as a sum of the classification lass and the regression loss.

3. The method of claim 2 further comprising:
training an auxiliary network to predict reweighting factors for the losses.

4. The method of claim 2 wherein:
the loss for the classification branch is calculated by a focal loss function; and
the loss for the regression branch is calculated by a $SmoothL_1$ function.

5. The method of claim 1 wherein:
the origin-domain images comprise a training dataset, a validation dataset and a testing dataset; and
the cross-domain images comprise a testing dataset.

6. The method of claim 1 further comprising:
removing from the dataset images exhibiting low resolution and high blurriness.

7. The method of claim 1 further comprising:
randomly cropping and adjusting brightness of images in the dataset.

8. A method of training a detector for use in a retail setting for text detection, text recognition and product matching comprising:
obtaining a product gallery containing product images annotated for text regions and text transcriptions;
applying a text detector to extract text from a query image;
applying a text recognizer to the extracted text to obtain intermediate features of the extracted text;
applying 2D position coding to the intermediate features to encode spatial information into the features to obtain encoded features;
calculating a textual similarity between the query image features and gallery image features.

9. The method of claim 8 further comprising:
determining a product match when the textual similarity is above a predetermined threshold.

10. The method of claim 8 further comprising:
applying a Hungarian Algorithm to calculate the textual similarity.

11. The method of claim 8 further comprising:
obtaining a testing dataset comprising:
  images annotated with text regions for text detection, wherein the annotated text regions further comprise word-level text transcriptions; and
  images having quadrilateral annotations for product detection, wherein a subset of the images for product detection are fine-grained images.

12. The method of claim 8 wherein the product gallery comprises:
quadrilateral annotated images, wherein a subset of the images are further classified as containing legible or illegible text.

* * * * *